Figure 5:
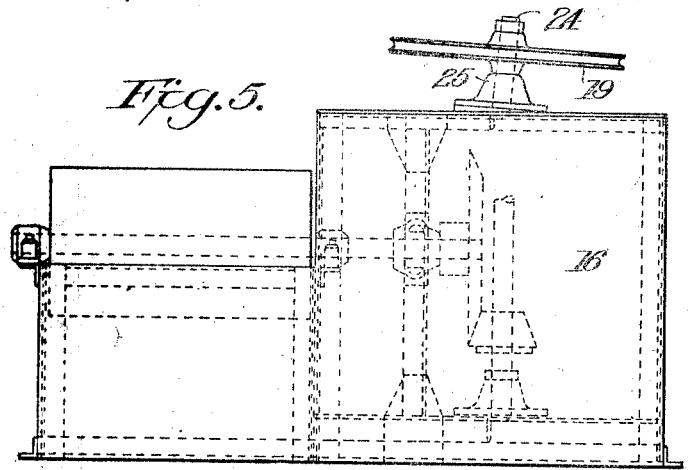

W. R. CUNNINGHAM.
CONVEYING SYSTEM.
APPLICATION FILED SEPT. 3, 1908.
928,183.
Patented July 13, 1909.
5 SHEETS—SHEET 1.
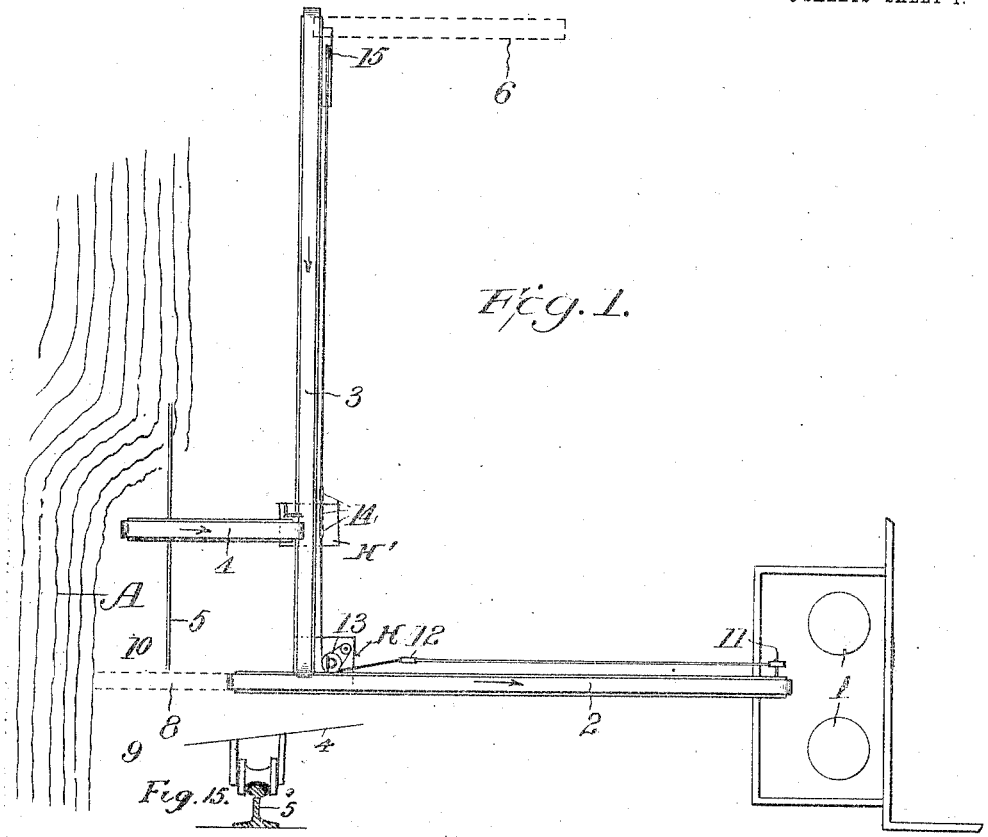
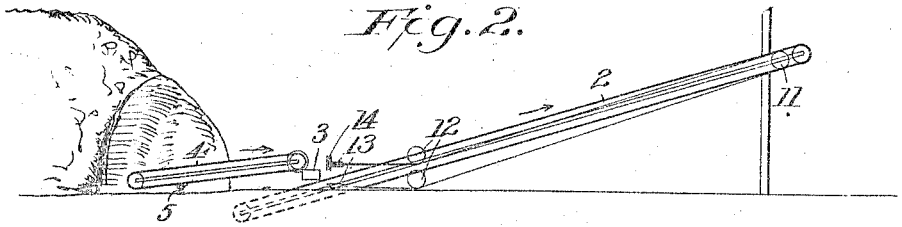
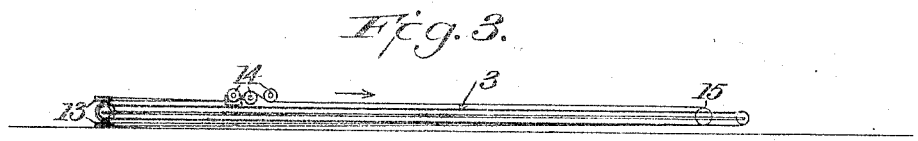
Inventor
William R. Cunningham
Witnesses
By J. Walter Fowler
Attorney

W. R. CUNNINGHAM.
CONVEYING SYSTEM.
APPLICATION FILED SEPT. 3, 1908.

928,183.

Patented July 13, 1909.
5 SHEETS—SHEET 2.

Inventor
William R. Cunningham.
By J. Walter Fowler
Attorney

Witnesses
C. H. Walker,
C. W. Fowler

W. R. CUNNINGHAM.
CONVEYING SYSTEM.
APPLICATION FILED SEPT. 3, 1908.
928,183.
Patented July 13, 1909.
5 SHEETS—SHEET 3.
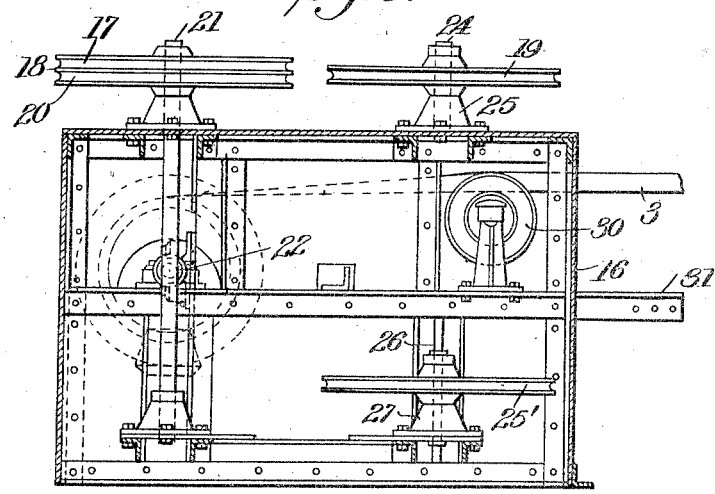
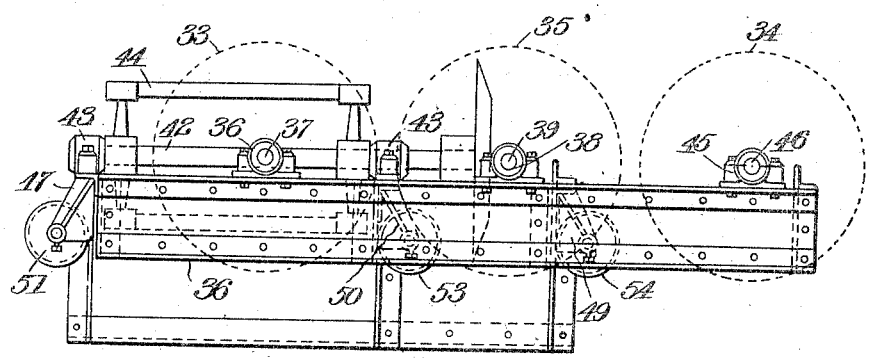
Witnesses
C. H. Walker
C. W. Fowler
Inventor
William R. Cunningham
By J. Walter Fowler
Attorney

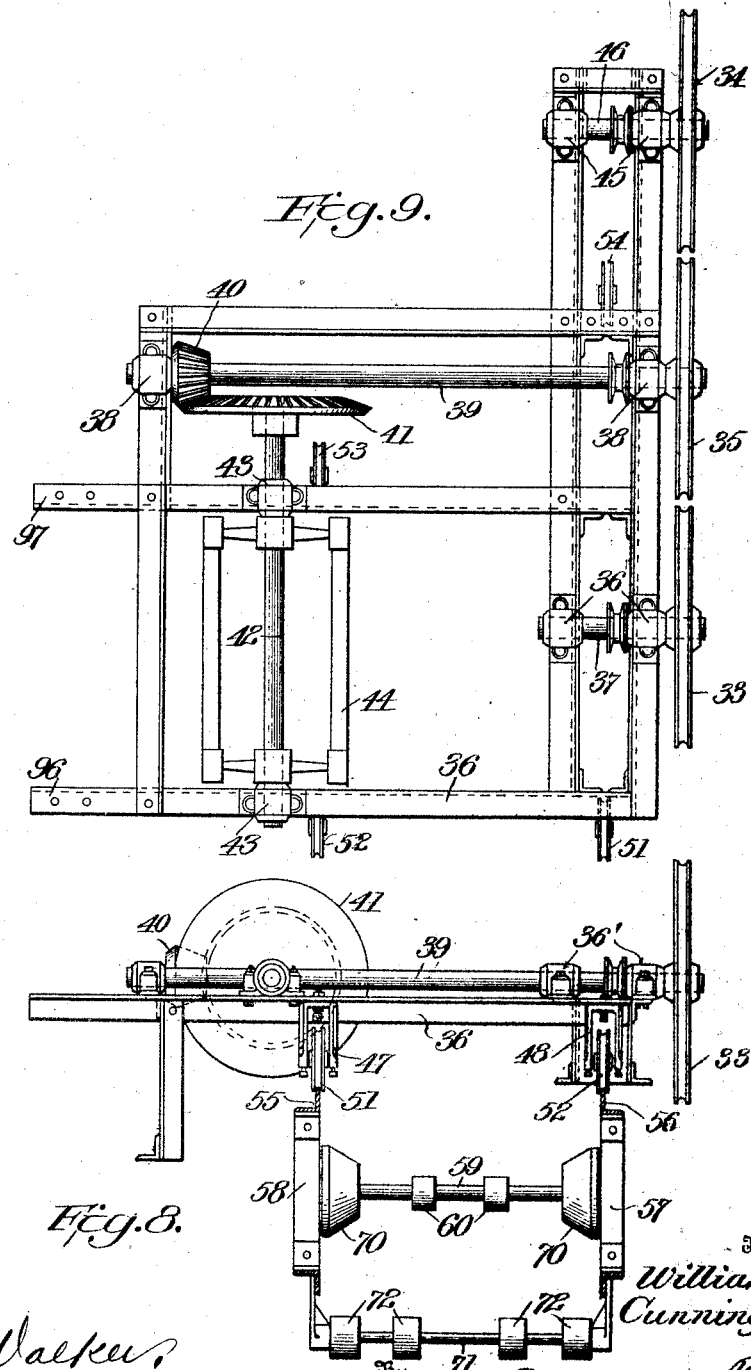

W. R. CUNNINGHAM.
CONVEYING SYSTEM.
APPLICATION FILED SEPT. 3, 1908.
928,183.
Patented July 13, 1909.
5 SHEETS—SHEET 5.
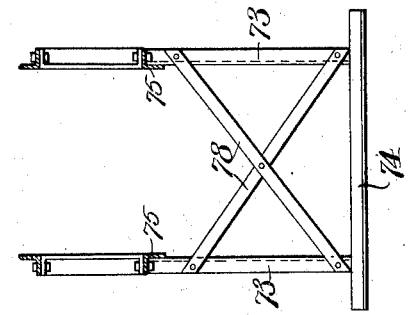
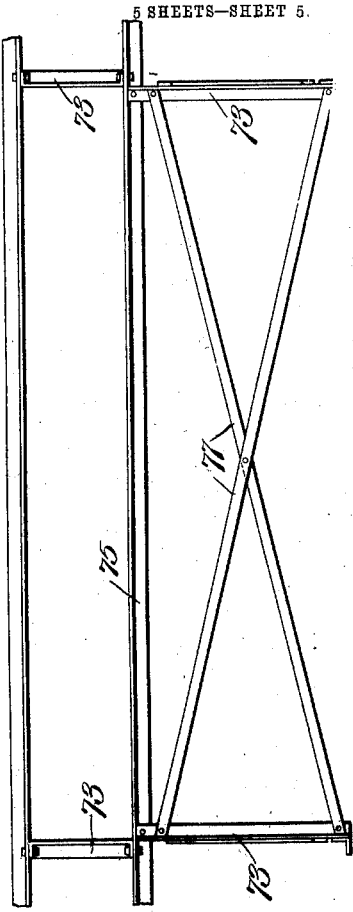
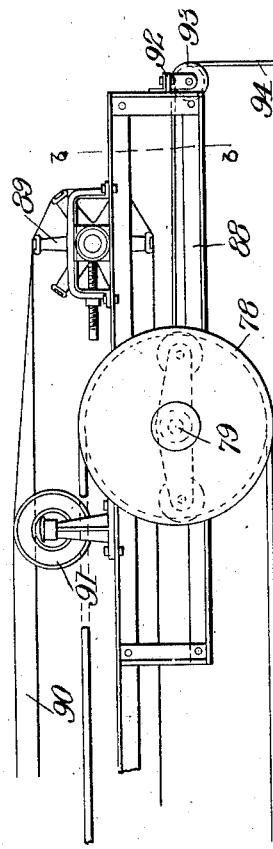
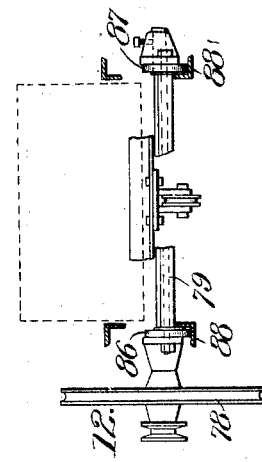
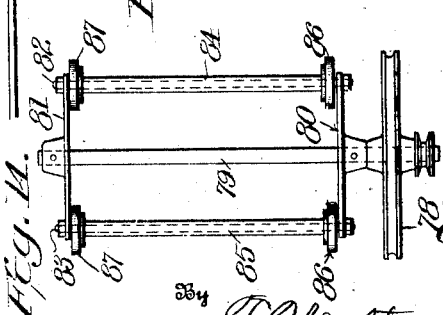
Witnesses
Inventor
William R. Cunningham
By J. Walter Fowler
Attorney

UNITED STATES PATENT OFFICE.

WILLIAM R. CUNNINGHAM, OF BUCYRUS, OHIO, ASSIGNOR TO THE AMERICAN CLAY MACHINERY CO., OF BUCYRUS, OHIO, A CORPORATION OF OHIO.

CONVEYING SYSTEM.

No. 928,183.      Specification of Letters Patent.      Patented July 13, 1909.

Application filed September 3, 1908. Serial No. 451,504.

*To all whom it may concern:*

Be it known that I, WILLIAM R. CUNNINGHAM, a citizen of the United States, residing at Bucyrus, in the county of Crawford and State of Ohio, have invented certain new and useful Improvements in Conveying Systems, of which the following is a specification.

My invention relates to an improved system and means for transporting clay or like loose material from the place where it is mined or dug to the machines which disintegrate it and prepare it for commercial uses, such as the manufacture of brick and clay products.

In the manufacture of brick, one of the serious problems to be encountered is digging or blasting the clay or shale and transporting it to the machinery building. Under the present method of handling clay at the clay bank it is customary to employ industrial cars adapted to run over tracks and trestles and to be moved from point to point by hoist or winding drum mechanism.

An objection to such a system is the expense attending the operation of the same, for it requires a man stationed in the pit to attach the cable and shift the cars into proper position, also a man to operate the winding drum for driving the loaded cars to the building. The trestle work is usually built on an incline and is arranged so that the cars are drawn high in the buildings to enable them to deposit the contents into suitable bins before being delivered to the grinding pans.

Dumping from one to five yards of clay, the amount commonly handled, is very severe on the hoppers and the buildings, and the cars delivering from one to five yards of clay at intervals makes it more difficult to regulate the feeding of the clay into the grinding machines.

To obviate the foregoing objections and to simplify the delivery of the clay from the bank where it is dug or detached by a blast, to the grinding mechanism, I have devised a system of apron or belt conveyers whose positions are capable of being shifted relative to the position of the bank and wherein the clay removed is shoveled or deposited onto the initial conveyer which is adapted to be shifted from place to place and to deliver the clay upon another conveyer, said conveyers being so arranged that one delivers upon the other and a final one delivers upon chutes in the building which in turn direct the clay into the grinding machines.

With the above and other objects in view, my invention consists of the parts and the constructions and combinations of parts which I will hereinafter describe and claim.

Figure 4:
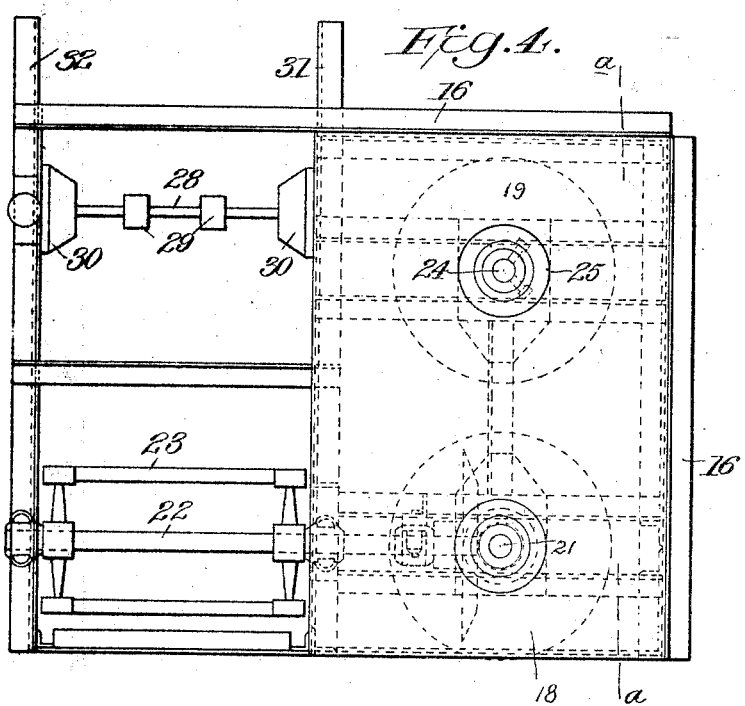

In the accompanying drawings forming part of this specification and in which similar reference characters indicate like parts in the several views:—Figure 1 is a diagrammatic plan view showing the arrangement of conveyers and grinding mechanism and the relation thereto of the clay bank. Fig. 2 is a side elevation of Fig. 1, Fig. 3 is an end elevation, Fig. 4 is a top plan view of the driving-head of the conveyer 3, the pulleys being shown in dotted lines, Fig. 5 is a side elevation of the same, Fig. 6 is a sectional view on the line *a—a* of Fig. 4, Fig. 7 is a side elevation of the movable driving-head for the conveyer 4, Fig. 8 is an end view of Fig. 7, Fig. 9 is a top plan view of the same, Fig. 10 is a side elevation of a part of the frame work of the conveyer, Fig. 11 is an end elevation of the same, Fig. 12 is a part sectional view on the line *b b* of Fig. 13 of the take-up at the end of the conveyer 3, Fig. 13 is a side view of the same, Fig. 14 is a top plan view of the carriage of the take-up, shown in Figs. 12 and 13, Fig. 15 is an enlarged detail of the track rail 5 and the roller support for the lower end of the conveyer 4.

In said drawings and particularly in the diagrammatic Figs. 1, 2 and 3 I illustrate a system where men stationed at the clay bank shovel the clay which has been loosened by blasting or other means, direct from the bank and deliver it onto the initial conveyer from which latter it is transferred automatically to a second conveyer which delivers it to a third conveyer leading to the building containing the grinding machines.

The building may be of such construction and arrangement as will best serve its intended uses, and suitably disposed therein are grinding pans, 1, adapted to receive the clay which is being delivered by a final conveyer whose discharge end is elevated high enough to deliver the clay into suitable bins, not shown, in the building and from which bins the clay is fed into the grinding pans by suitable means.

The conveyer, 2, which is herein shown as a final conveyer, is arranged at any suitable inclination and it receives the clay direct from a second or preceding conveyer, 3, which in Fig. 1 is shown as being arranged at right angles with the conveyer 2.

Arranged at right angles to the second conveyer, 3, is an initial belt conveyer, 4, which receives the clay at the clay bank and conveys the same and deposits it upon the conveyer, 3, for transmission to the final conveyer, 2, and to the grinding pans, said conveyer, 4, being adapted to be shifted from place to place in a plane substantially parallel with that of the direction of travel of the conveyer 3. In order that the conveyer, 4, may be shifted as described, I secure a suitable track rail, 5, on the ground near the clay bank or in the bottom of the clay pit, and I provide the conveyer, 4, with rollers to engage and operate over said track. In the system herein shown it is intended that the clay shall be blasted from the clay bank, A, in which case the conveyer, 4, would have to be moved toward conveyer, 2, or twty from the part of the bank being blasted in order to protect said conveyer from being injured by the clay falling onto it when the blast is made; at the same time as the workmen work along into the clay bank, A, the conveyer should be drawn toward them so as to facilitate the handling of the clay and reduce the labor required to throw the clay onto the conveyer, 4.

While I have shown the conveyer, 4, as arranged at right angles to the conveyer, 3, it will be manifest that its position may be changed; in some cases it may be necessary to place it on the other side of the conveyer, 3, as shown by the dotted lines, 6, in Fig. 1; in other cases, the conveyer, 2, may be extended outwardly as shown by dotted lines, 8, and the conveyer, 4, placed upon either side of this extension, as for instance at the places marked 9 and 10. In either case the essential feature of the invention is the employment of a movable conveyer that can be moved along with the work or moved out of danger when a blast is employed.

The system of conveyers herein shown and described is intended to be driven by a rope driven from a sheave, 11, mounted on the driving-head of the conveyer, 2. Only from said sheave the rope passes over properly guided sheaves or pulleys, 12, and around sheaves, 13, over sheaves, 14, and passing onto take-up, 15, the lower run of the rope, returning in the same direction and being guided by sheaves provided for the purpose.

In Figs. 4, 5 and 6, I show by enlarged views the preferred means for constructing the driving head H of the conveyer and the means for driving said conveyer, said means comprising a steel frame, 16, of suitable form and dimensions and built up preferably from structural steel.

In Fig. 6, is shown the pulley or sheave, 18, into the groove, 17, of which the driven-rope is suitably guided and from whence it passes over a sheave, 19, which is set at an angle as shown in Fig. 5 in order to guide said rope after it passes around the sheave, 19, and into the groove, 20, of the sheave, 18, after which the rope is fed parallel with the conveyer, 3. The sheave or pulley, 18, is mounted on a shaft, 21, which is arranged at right-angles with the shaft, 22, and which latter carries a built-up drum or pulley, 23, over which passes and is driven thereby, the belt of the conveyer, 3. Suitable journal-bearings are provided for the shafts, 21 and 22, and these are secured to the structural steel frame, 16, by any well known and suitable method. There is also bolted or otherwise secured to the top members of the frame, 16, a casting, 25, in which is secured a trunnion, 24, upon which the guide pulley, 19, is loosely mounted. There is also mounted in the frame a guide pulley, 25', which is designed for the purpose of guiding the lower run of the rope returning the rope to the driving head of the conveyer, 2, said pulley, 25', being mounted on a trunnion, 26, which is secured to a casting, 27, bolted to members of the steel frame, 16. The shaft, 28, and its pulleys, 29 and 30, illustrate one of a series of shafts properly distributed along the conveyer and designed to support the apron or belt.

In Fig. 4, I show the members, 31 and 32, of the steel frame of the driving-head of conveyer, 3, and to these members is bolted the frame-work of the conveyer and which frame work is shown more particularly in Figs. 10 and 11. By constructing the driving-head of the conveyer, 3, in the manner described and shown, I am permitted to make this driving head self-contained and rigid so as to keep the sheaves, shafts, gearing and other parts in perfect alinement. After the rope leaves the sheaves, 18, it is received by passing under a sheave, 33, and over a sheave, 34, and under a sheave, 35, of the driving-head, 36, of the other conveyer, 4, and which conveyer I will now particularly describe, having reference to Figs. 7, 8 and 9 of the drawings. The frame for the driving-head H² of the conveyer, 4, is designed from structural steel as shown and on this frame are mounted journal-boxes, 36', in which a shaft, 37, is mounted, said shaft carrying the guide sheave, 33. I also secure to the frame, 36, suitable journal-boxes, 38, for a shaft, 39, which is arranged parallel with the shaft, 37, and carries upon one end the driving-sheave, 35, and upon the other end a bevel-pinion, 40, which is designed to mesh in a bevel gear, 41, on one end of a shaft, 42, arranged at right-angles with the said shafts, 37 and 39, and transversely of the frame of the driving-head, 36, said frame carrying journal boxes, 43, for said shaft, 42. Secured to the shaft, 42, is a head-pulley or drum, 44, of suitable construction and which is designed to drive the belt for conveyer, 4. I also secure to the top of the frame, 36, suitable journal-boxes, 45, Figs. 8 and 9, in which are mounted a shaft, 46, carrying the aforesaid sheave, 34.

Suitable truck-saddles, 47, 48, 49 and 50, are appropriately bolted to the driving-head frame, 36, and carry rollers, 51, 52, 53 and 54, which are designed to run upon a suitable track formed by angle-irons, 55 and 56, of the frame, said tracks being supported by posts, 57 and 58, placed at intervals along the conveyer, 3, said tracks extending the full length of this conveyer. I also place at intervals along the length of the conveyer, 3, suitable shafts, 59, having pulleys, 60, intermediate of their ends and other cone-shaped pulleys, 70, at the ends adapted to support the upper run of the conveyer belt, said cone-pulleys being designed to up-turn the edges of the belt to give said belt substantially a trough-form. Suitable rollers, 72, mounted on shafts, 71, placed at intervals along the frame-work are also employed for supporting the lower run of the belt of the conveyer, 3, to insure the proper travel of this belt.

By constructing the driving head-frame as described and mounting thereon the rollers, 51, 52, 53 and 54, adapted to travel on the tracks, 55 and 56, the driving-head of the conveyer is kept in perfect alinement at all times, and by the rope passing under the sheaves, 33 and 34, and over the sheave, 35, the said belt is driven at all times no matter where or in what position it may be located between the clay-bank and the line of the conveyer, 2, upon which it delivers the clay.

Figs. 10 and 11 show the construction of the frame work used for supporting the intermediate portions of the conveyers and which frame-work comprises suitable uprights or supports, 73, which are bolted to the longitudinal frame bars, 75, of the conveyer, 3, said uprights or supports being placed at such intervals along the frame as conditions may require and being suitably stayed or braced by longitudinal and transverse lattice brace-bars, 77 and 78.

In Figs. 12, 13 and 14, I illustrate the take up at the end of the conveyer, 3, and which operates in conjunction with the loose sheave, 78, over which the upper run of the drive-rope passes after it leaves the sheave, 34, before mentioned, said sheave, 78, being mounted loosely on a shaft, 79, carried by the end members, 80 and 81, of the take-up frame and which members are held in suitable position spaced apart by rods, 82 and 83, passing through sleeves or distance pieces, 84 and 85. On the rods between the inner sides of the frame members, 80 and 81, and the ends of the sleeves, or distance pieces, are suitable rollers, 86 and 87, adapted to run on the lower parallel members or angles, 88, of the sides of the take-up guide frame and which frame forms a part of the conveyer, 3, and is attached to the main member, 75, of said conveyer. The take-up pulley, 89, is clearly shown in Fig. 13, and it carries the belt, 90, of the conveyer, 3, which belt runs over one of the supporting pulleys, 91. Fig. 13, also shows a hanger, 92, fixed to the outer end of the take-up frame and provided with a pulley, 73, over which I pass a rope or cable, 94, one end of which is attached to the take-up frame while the other end carries a weight, 95, which may drop into a well and be so arranged that the amount of the weight may be increased or reduced to regulate the tension on the driving-rope and to insure this rope being always sufficiently taut for driving purposes. The frame of the initial conveyer, 4, is bolted or otherwise secured to the extending portions, 96, and 97, of the frame, 36, of the driving head of the conveyer.

From the foregoing description it will be manifest that by my arrangement of conveyers and associated parts I provide a system of transmission wherein the shiftable conveyer upon which the clay or material is first deposited is positively driven at all times no matter what position it is necessary to place it relative to the clay bank and companion conveyers, and it can be removed out of danger of being damaged or destroyed when making a blast and then moved up close to the workmen so that they are able to throw the loosened or dislodged material onto it with the least labor possible. The clay is also distributed along the belts or conveyers, and is so deposited and transported that it is so uniformly delivered to the grinding pans that it is possible for me to dispense with labor-feeding the clay into the grinding pans, that is now required when using cars for transporting the clay, unless an automatic feeder for the pans is used.

Having thus described my invention, what I claim and desire to secure by Letters Patent is:—

1. A system for conveying loose material, said system including a belt-conveyer located at the place of loading, a second belt conveyer operable across the delivery end of the first-named conveyer and adapted to receive the material therefrom, supporting frames upon which said conveyers are mounted, a support for the receiving end of the first-named conveyer and a track upon which the support is movable in a plane substantially at right angles to the direction of movement of the conveyer, and a driving head mechanism at the delivery end of the first-named conveyer and shiftably supported on the framework thereof.

2. A system for transporting loose material, said system including a belt-conveyer located adjacent to the place of loading, parallel guide tracks located at opposite end portions of the conveyer said tracks extending substantially at right angles to the direction of travel of the conveyer, a wheeled support at the receiving end of the first-named conveyer and shiftably mounted on one of said tracks, a wheeled driving-head at the delivery end of said first-named conveyer and mounted on the other of said tracks, a second belt conveyer arranged to receive material carried over the delivery end of the first-named conveyer, and a single drive rope and pulley-mechanism for operating both conveyers.

3. A system for transporting clay from the bank or place of digging, said system comprising a belt-conveyer located proximate to the bank and shiftable relative thereto as digging progresses; a second belt conveyer operating substantially cross-wise of and below the plane of the delivery end of the first conveyer; a conveyer receiving the clay from the second-named belt, and a single cable-drive mechanism and head-drums for the several conveyers whereby said conveyers are driven in unison.

4. In a system of the character described, the combination with a belt conveyer and a track or guide rail arranged substantially parallel therewith, of a belt conveyer arranged substantially at right angles to the first conveyer and extending therefrom to a point proximate to the material to be conveyed, a support for the second-named conveyer having a bearing engaging and operable over said track or guide rail, a drive-cable extending parallel with the first-named conveyer, sheaves or pulleys for said drive cable, and intermeshing gears and transmitting shafts between said sheaves or pulleys and the head end of said second-named conveyer.

5. In a conveying system of the character described, an endless belt and a supporting frame therefor, a horizontal shaft mounted transversely across the head end of the framework, a drum on said shaft over which the belt passes, a vertical shaft mounted in a lateral extension of the head end of the frame-work, a guide sheave on said shaft, transmitting gears between the horizontal and vertical shafts, and a driving cable engaging said sheave.

6. In a conveying system of the character described, an endless belt and a supporting-frame therefor formed of structural-metal, horizontal and vertical shafts mounted in the head end of the frame-work, intermeshing gears between adjacent ends of the shafts, a drum on the horizontal shaft over which the belt passes, a sheave on the vertical shaft, a drive-cable engaging said sheave, a second guide-sheave on the framework and mounted at an incline and adapted to direct the course of said cable.

7. In a conveying system of the character described an endless belt and a supporting-frame therefor formed of structural-metal, horizontal and vertical shafts mounted in the head end of the frame work, intermeshing gears between adjacent ends of the shafts, a drum on the horizontal shaft over which the belt passes, a sheave on the vertical shaft, a drive-cable engaging said sheave, a second guide-sheave on the framework and mounted at an incline and adapted to direct the course of said cable, a second horizontal shaft mounted in the frame-work and cone-pulleys on the ends of the second horizontal shaft and adapted to up-turn the edges of the belt.

8. In a conveying system of the character described, an endless belt and a supporting-frame therefor formed of structural-metal, horizontal and vertical shafts mounted in the head end of the frame-work, intermeshing gears between adjacent ends of the shafts, a drum on the horizontal shaft over which the belt passes, a sheave on the vertical shaft, a drive-cable engaging said sheave, a second guide-sheave on the framework and mounted at an incline and adapted to direct the course of said cable, a second horizontal shaft mounted in the frame-work and cone-pulleys on the ends of the second horizontal shaft and adapted to up-turn the edges of the belt, and a guide-sheave in the lower part of the head-end of the frame-work over which the return-run of the belt passes.

9. In a conveying system of the character described the combination with a belt-conveyer and a supporting frame-work therefor said frame-work being constructed with longitudinal guide-rails in its upper portion, of a cross-conveyer having a frame the head-end of which is provided with rollers which are adapted to travel on said tracks, a shaft mounted transversely across said head end of the frame, a drum on said shaft, over which the belt passes, a vertical shaft mounted in a lateral extension of the head of the cross-conveyer frame, a guide sheave on said vertical shaft, transmitting gears between said shaft, a drive-cable, and a guide track at the other end of the cross-conveyer and arranged parallel with the first-named guide tracks whereby the cross-conveyer is shiftable to different points along the first-named conveyer.

10. In a conveying system of the character described, the combination with a belt-conveyer and a supporting frame-work therefor said frame-work being constructed with longitudinal guide-rails in its upper portion, of a cross-conveyer, having a frame the head end of which is provided with rollers which are adapted to travel on said tracks, and a guide-track at the other end of the cross-conveyer and arranged parallel with the first-named guide-tracks whereby the cross-conveyer is shiftable to different points along the first-named conveyer, and a single drive-cable for operating the two conveyers.

11. In a conveying system of the character described the combination with an endless belt-conveyer and a supporting frame-work therefor, said frame-work being constructed with longitudinally extending guide-rails, of a second conveyer arranged at right-angles to the first conveyer and comprising an endless-belt and end drums therefor, a supporting frame-work for the second conveyer, rollers on the head-end of the second frame-work to operate over the guide-rails of the first frame-work, a drive-cable and sheaves on the second frame-work engaged thereby, a shaft arranged parallel with the direction of travel of the second conveyer, gearing between said shaft and the head-end drum of the second conveyer, and a sheave on said shaft engaged by the drive-cable.

12. In a conveying system of the character described, the combination with a conveyer comprising an endless-belt and end drums over which it passes, of a belt-conveyer operable at right-angles to the first conveyer, a frame-work for the second conveyer, said frame-work being of structural-metal and comprising longitudinal and cross-supports and crossed braces, and guide-rails extending along the upper part of said frame-work, said first conveyer having its head end provided with rollers to engage the track-rails of the frame-work of the other conveyer, and means for operating the conveyers.

13. In a conveying system of the character described, the combination with a conveyer comprising an endless-belt and end-drums over which it passes, of a belt-conveyer operable at right-angles to the first conveyer, a frame-work for the second conveyer, said frame-work being of structural-metal and comprising longitudinal and cross-supports and crossed braces, and guide-rails extending along the upper part of said frame-work, said first conveyer having its head-end provided with rollers to engage the track-rails of the frame-work of the other conveyer, and means for operating the conveyers, said means comprising a drive-cable and guide-sheaves therefor.

14. In a conveying system of the character described, the combination with a conveyer comprising an endless-belt and end-drums over which it passes, of a belt-conveyer operable at right angles to the first conveyer, a frame-work for the second conveyer, said frame-work being of structural-metal and comprising longitudinal and cross-supports and crossed braces, and guide-rails extending along the upper part of said frame-work, said first conveyer having its head-end provided with rollers to engage the track-rails of the frame-work of the other conveyer, and means for operating the conveyers, said means comprising a drum-cable, a sheave therefor at the outer end of said frame-work, a roller-frame for said guide-sheave, a guide-track on the frame-work on which said roller frame is mounted, and means connecting with the roller-frame for maintaining tension on the drive-cable.

In testimony whereof I affix my signature in presence of two witnesses.

WILLIAM R. CUNNINGHAM.

Witnesses:
JOHN S. DE LASHMUTT,
S. E. AUCK.